United States Patent [19]
Priaroggia

[11] 4,068,489
[45] Jan. 17, 1978

[54] METHOD AND APPARATUS FOR LAYING AN OIL FILLED CABLE AT DEPTHS BELOW THE LAYING EQUIPMENT

[75] Inventor: Paolo Gazzana Priaroggia, Milan, Italy

[73] Assignee: Industrie Pirelli Societa per Azioni, Milan, Italy

[21] Appl. No.: 719,121

[22] Filed: Aug. 31, 1976

[30] Foreign Application Priority Data

Sept. 26, 1975 Italy .................................. 27675/75

[51] Int. Cl.$^2$ .............................................. F16L 1/00
[52] U.S. Cl. ........................................ 61/105; 61/107; 61/63; 174/8; 254/134.3 SC
[58] Field of Search .................................. 61/105–114, 61/63; 174/8, 10, 24; 254/134.3 R, 134.3 SC

[56] References Cited

U.S. PATENT DOCUMENTS

| | | | |
|---|---|---|---|
| 1,301,830 | 4/1919 | Fuchs | 254/134.3 R |
| 3,093,333 | 6/1963 | Bishop | 254/134.35 C X |
| 3,608,710 | 9/1971 | Pugh | 174/10 X |
| 3,635,036 | 1/1972 | Hooper | 61/105 |
| 3,661,358 | 5/1972 | Dill | 254/134.3 R |
| 3,695,297 | 10/1972 | Ferrentino | 138/30 |
| 3,996,758 | 12/1976 | Cherrington | 61/105 |

FOREIGN PATENT DOCUMENTS

| | | | |
|---|---|---|---|
| 709,857 | 8/1941 | Germany | 174/10 |
| 113,177 | 2/1945 | Sweden | 174/24 |

*Primary Examiner*—Dennis L. Taylor
*Attorney, Agent, or Firm*—Brooks, Haidt, Haffner & Delahunty

[57] ABSTRACT

Method and apparatus for laying an oil filled, electric cable at great depths and under conditions whereby the weight of the oil may cause internal cable pressures which will rupture the cable. In the method, the leading cable end is fed over a guide which is higher than the point at which the weight of the oil column between the guide and the cable source is equal to the normal oil pressure in the cable and is then fed downwardly but without exceeding an amount which would cause the oil column pressure after the guide to exceed safe limits for the cable. The pressure on the oil at the cable source is then reduced producing a torricellian vacuum in the cable at or near the guide which is maintained at a value such that the weight of the oil in the vertical section of the cable does not exceed safe limits. The apparatus includes the guide and pressure regulating and indicating devices at the cable oil source and the leading end of the cable.

5 Claims, 3 Drawing Figures

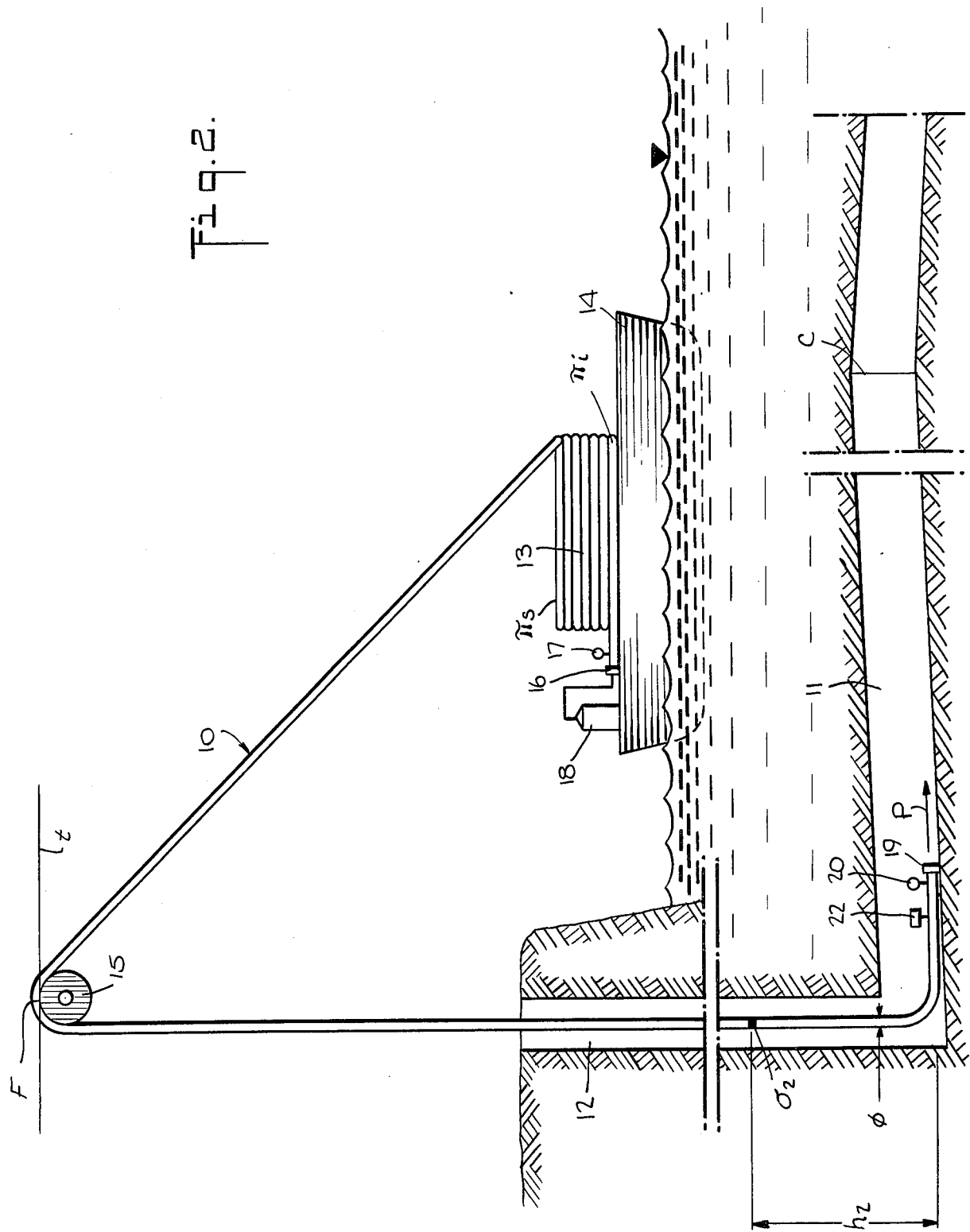

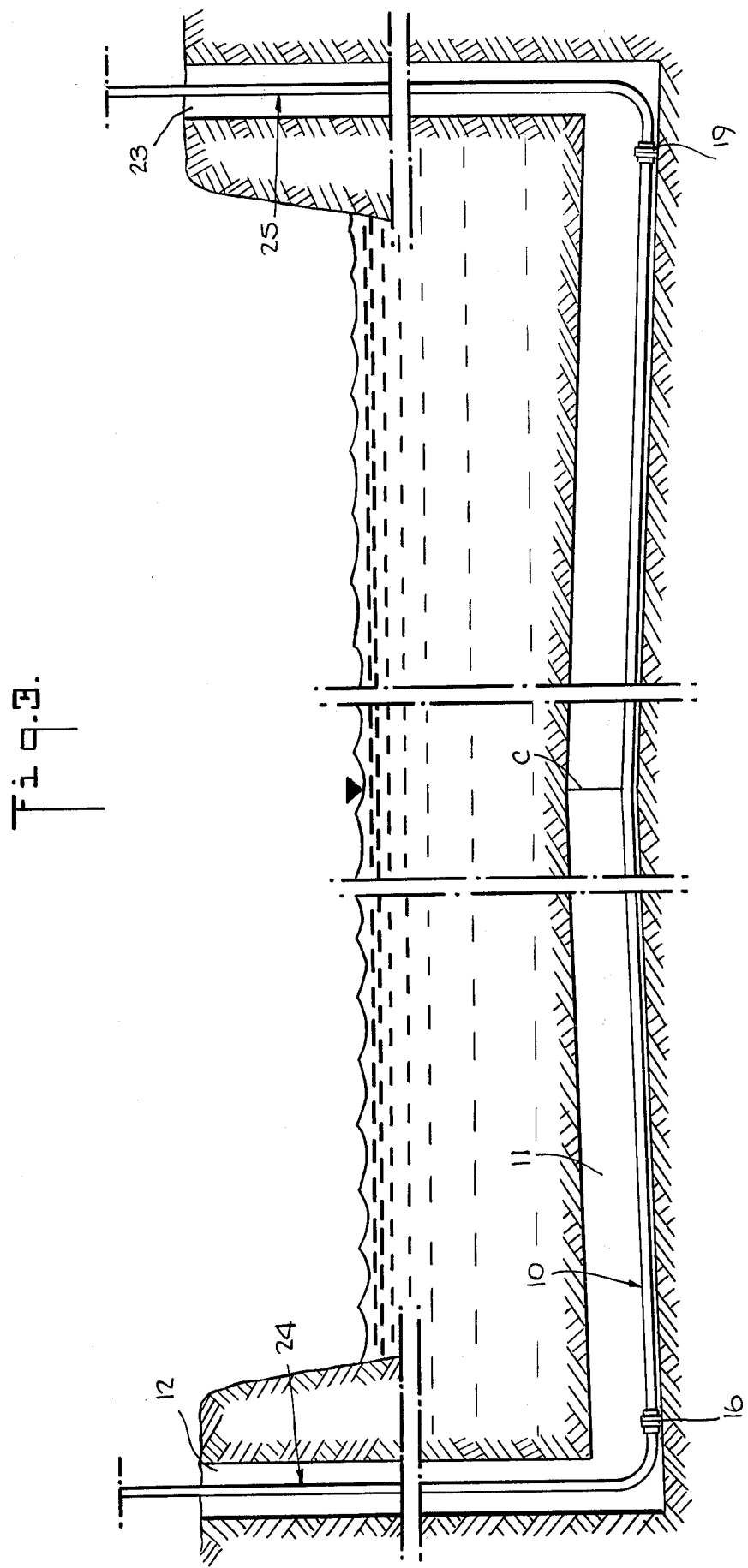

METHOD AND APPARATUS FOR LAYING AN OIL FILLED CABLE AT DEPTHS BELOW THE LAYING EQUIPMENT

The invention relates to methods and apparatus for laying an oil filled cable at depths with respect to the laying equipment which may cause the oil pressure to exceed the stress capabilities of the cable, and particularly to the laying of such a cable in a gallery which is at a great depth below sea level.

It is known in the art that oil filled cables are cables having composite insulating, paper and/or similar materials, dielectric liquid (insulating or impregnating oil) and are of the self-contained type. The oil filled cables to which invention laying system applies is suited to the conveying of great amounts of energy at high voltages, e.g., by a 400 kilovolt D.C. system, 800 megawatts can be conveyed.

It is known that the transfer of electric energy between two points remote from each other can be performed using either D.C. or A.C., the system chosen depending upon actually existing factors. The use of an oil filled cable rather than of other cable types, can be preferred because of its unique reliability properties.

In the case where great amounts of electric energy have to be conveyed from one point to another one which is remote from the former with the sea intervening, it may be preferable, because of marine traffic or because of the presence of great ice masses (e.g., icebergs), to dig out a horizontal gallery beneath the sea and having a slight slope from its center towards its end, for allowing water drainage. Into such a gallery, said cable, wound in coils, can be lowered and then drawn along it by traditional methods. However, this system would require enormous excavations when the height of the wells, at the gallery ends, is hundreds of meters deep and the gallery involved is one of some tens of kilometers long, which latter means that coils of large dimensions have to be lowered into the wells, e.g., each carrying 500 meters of oil filled cable which causes numerous joints to be necessary in the finished oil filled cable.

Accordingly, it would be better to have recourse to a system of transferring the cable vertically or longitudinally thereof into the well, and then pulling it along the gallery bound to a steel rope by the known and so-called "lateral bonding" system. However, this system, without the methods of the invention, would not permit the use of an oil filled cable of the same type, or with the same metallic band blindage and damage resistant structures which are generally helicoidally wound on cable metallic sheath and which are known to those skilled in the art by the name "frettage", as are used for conventionally laid cables, which are laid about one and a half meters below ground level, because special and expensive reinforcement structures would be necessary.

It is believed to be clear that, for reaching the gallery, a cable should be vertically lowered into a well provided for this purpose. Since such a well is some hundreds of meters deep, then each cable section, when passing through the lowest point of its run, will be subjected to an oil column which will exert on the cable a pressure of some tens of relative atmospheres in addition to the pressure for which the cable has been dimensioned, and it would then be necessary to provide in advance for an overdimensioning of cable frettage layers, such overdimensioning being exclusively for the purpose of resisting the overpressures occurring during the laying of the cable. This fact would not only make even an oil filled cable very expensive, but also difficult to handle. The difficulty could be overcome by way of performing within the cable a great number of stop joints which could reduce the extent of the lengths lowered and, therefore, the highest laying pressure. This, however, would enormously increase the cost of laying, because of several connections, and would introduce many weak points, as generally, the joints are, from the point of view of electrical performance. Overpressures which would occur during laying would, however, have an influence not only on cable structure, but also on all accessories which are indispensable in a cable installation and for its maintenance. It should be considered, for example, what complicated equipment would be necessary for feeding a cable under some tens of relative atmospheres, instead of 0.5 to 3 relative atmospheres, as the case normally is for oil filled cables installed at a conventional level or for short lengths thereof.

The purpose of the present invention is to teach a laying system which allows for the use of conventional type oil filled cables in long lengths thereof and even of some tens of kilometers, e.g., made by the method suggested in U.S. Pat. No. 3,918,281, without any structural modifications either of the cables or of connected installations. For example, with relation to both feeding and insulating oil compensation, simple pressure compensators, which are inexpensive and easily transported, e.g., of the type disclosed in U.S. Pat. No. 3,695,297 and in Argentine Pat. Nos. 197,918 and 199,124.

More particularly, one object of the present invention is a system for laying oil filled cables in a gallery which is at a great depth below sea level, in which the cables are lowered longitudinally thereof into a vertical well. The system is particularly adapted for laying cables for the transfer of great quantities of high voltage energy between two remote points and which have the structure used for cables laid at or close to sea level. In such system, torricellian vacuum is produced within the cable which acts at least on the vertical portion of the cable, while, at the same time, an insulating oil column with a pre-set pressure and consistent with operating limits of the cable, is maintained in the forward end, or end in the direction of advance, of the cable. A preferred embodiment of the invention comprises the following phases:

1. the transferring of forward end of head of said oil filled cable from a skein thereof into a vertical well while passing it through a path comprising, at least for its initial portion, in the form of a suspended and tensioned cable and at the end of such portion at least a guide means, the tangent to the top of which is located at a height "$h$" which is greater than the height "$h_o$" of insulating oil column which corresponds to zero relative pressure with respect to lower end of the skein;
2. the reduction of pressure within oil filled cable, by acting on the internal pressure at the skein, so that oil level along said initial portion takes a height "$h_i$" with respect to lower end of the skein, which is lower than or equal to said height "$h$" but, in any case, higher than said height "$h_o$", said pressure reduction step being performed when the pressure on said cable forward end reaches a pres-set, operating or limiting value during the transit of the forward end into the vertical well.

A further object of the present invention is apparatus for carrying out said laying system which comprises at least the following means:

i. an insulating oil feeding tank and a pressure measuring instrument for measuring the pressure of said oil connected to measure the internal pressure on said skein;

ii. a cable suspension and transferring device arranged vertically above the well and at a higher position than any other suspension and guide means provided for the cable and in any case at a greater height, with respect to the lower end of the skein, than the portion of an insulating oil column at which the relative pressure is equal to zero.

Other objects and advantages of the present invention will be apparent to those skilled in the art from the following description of presently preferred embodiments thereof, which description should be considered in conjunction with the accompanying drawings in which:

FIG. 2 is a view similar to FIG. 1 showing the cable position as it slides along the gallery; and FIG. 3 is a view similar to FIG. 1 which shows a cable laid in the gallery between the remote points which correspond to the feeding area and the utilization area, respectively.

Figure 1:
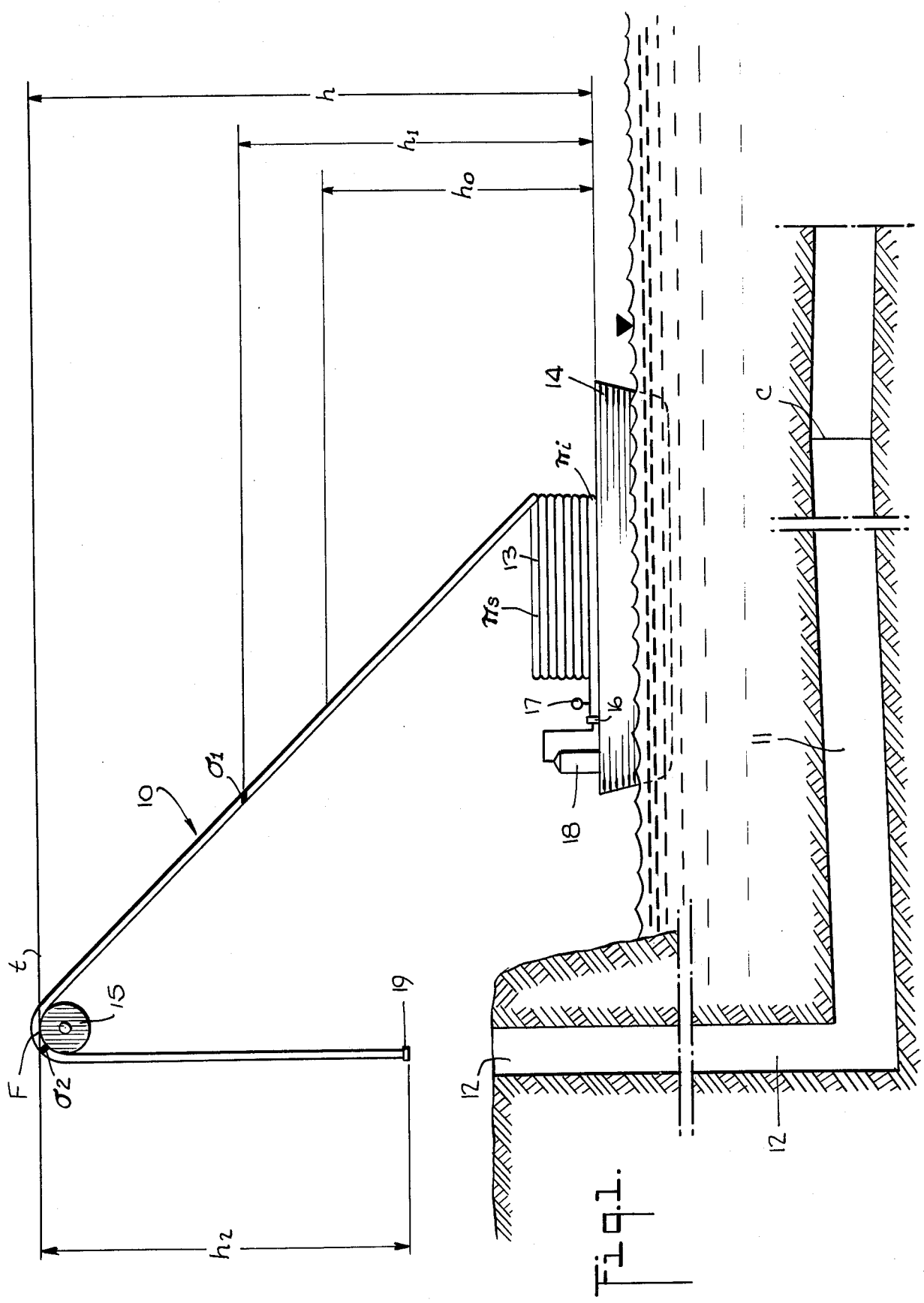
FIG. 1 is a diagrammatic elevation view, partly in cross-section, of an embodiment of the system of the invention showing an early position of an oil filled cable as it is being laid into a gallery extending between two remote points, through a deep vertical well and before introduction of the cable into said well.

The oil filled cable 10 shown in the drawings preferably is manufactured according to the processes described in said U.S. Pat. No. 3,918,281 in a long length, e.g., having a length of one or more tens of kilometers, and it is of the structural type dimensioned for being used in a conventional manner, which shall be defined, for ease of illustration, as dimensioned for use at sea level and with an insulating oil pressure, for example, between 0.5 and 3 relative atmospheres. Of course, it will be apparent to those skilled in the art that the cable 10 may be manufactured by any other appropriate process provided such process allows the cable lengths to be just as long, without any continuity problems and, in particular, a lead sheath free of defects such as inclusions, blow-holes or through-holes.

In the embodiment illustrated, the fluid oil filled cable 10 has to be laid into a gallery 11 which is, for example, one or several tens of kilometers long and which is located at a great depth below sea level, such as, one or more hundreds of meters. The gallery 11 is generally horizontal or, preferably, as shown in the drawings, provided with a slight slope from central section $c$ toward each of the ends and acts to drain water, etc. toward the ends.

In the gallery 11, all facilities (not shown) which are necessary for drawing the cable 10 in the direction of the arrow P during its laying, for its maintenance and for communication of the operator with the environment outside of the gallery 11, etc. are disposed. Access to the gallery 11 is obtained through two vertical wells, one of which, well 12, is located on the shore in the area of the cable laying and the other well, 23, (FIG. 3) on the remote shore area to which the cable 10 must extend, said wells 12 and 23 having a depth of some hundreds of meters, e.g., between 300 and 400 meters.

In both FIG. 1 and FIG. 2, the cable 10 is wound into a skein 13 and is carried by a water craft 14. It is to be understood, however, that, for various reasons, it may be less expensive and technically more appropriate to transfer the cable 10 from the water craft 14 onto solid ground to another skein, and then start the laying of the cable 10 from solid ground.

Said water craft 14 also carries conventional cable laying devices, such as, for example, a first roller conveyor (not shown) which serves to feed the cable 10 while unwinding it from its skein towards the shore. A guiding means comprising at least a pulley or roller 15, which is supported by any conventional means (not shown), supports the cable 10 and guides its movement in the vertical well 12. Inflection of the cable 10 at the top of the roller 15 and the curved section of cable 10, which is indicated by the reference F, will hereinafter be called the curvature section.

The roller 15 is so arranged that the tangent line "$t$" at the highest point or top of the roller 15, with respect to the lower end of the skein 13 which, in FIGS. 1 and 2 is the lowest turn $\pi i$, is at a height such that $h > h_o$, where $h_o$ is the height of the insulating oil column at which the relative pressure is equal to zero. In other words, the height $h_o$ is the point at which the upward force from the pressure applied to the oil at the craft 14 is balanced by the downward force due to the weight of the oil. Height $h$ might also be measured with respect to a skein turn other than the lowest one, in the event that safety reasons should indicate it to be desirable. For example, for taking into account critical arrangement of horizontal windings, height $h$ might also be measured with respect to upper skein turn $\pi s$. However, height $h$ is lower than the insulating oil column which would provide a pressure exceeding that for which the cable 10 is designed to withstand.

The trailing or back head 16 of the cable 10 in the skein 13 is connected to a first cable pressure measuring device, e.g., a gauge 17, and to a tank 18. The latter is of the low pressure oil feeding type and, therefore, easy to handle, inexpensive and, preferably, is of the type as described in both U.S. Pat. No. 3,695,297 and in said Argentine patents.

The other forward or leading head 19 of the cable 10 is connected (FIG. 2) at least to a second cable pressure measuring device, preferably, a vacuum gauge 20, and is also provided with an overpressure valve 22. The tank 18, gauge 17, roller, guiding means, suspension or transferring means 15, as well as the vacuum gauge 20 and overpressure valve 22, are comprised in the means forming the apparatus for carrying out the laying process of the present invention, which will be described hereinafter with reference to the drawings.

The oil filled cable 10 is unwound from the skein 13 into which it has been previously wound, by pulling its forward head 19, the cable 10, at least in its initial portion of the path it follows, taking a suspended cable shape to a first (not shown) rolling means or roller from which it is then conveyed onto the other guiding or suspension means 15 supported on solid ground. Finally, by way of the curvature section F, the head 19 is transferred into the vertical well 12 where it is lowered, bound to a steel rope (not shown) by means of a system which is known as "lateral bonding". Preferably, the transferring of the cable 10 into said vertical well 12 takes place continuously and possibly at constant speed, even though stopping, during its laying, for technical or checking reasons, is permissible.

As stated hereinbefore, the oil filled cable 10 is of the type that can be used at sea level and its normal insulating oil pressure can therefore be from about 0.5 to about 3 relative atmospheres. It follows, therefore, that it has a structure which is able to stand these pressures but not pressures significantly higher. Therefore, if one were to continue transferring the cable 10 so that it continues to be lowered into the vertical well 12, i.e., with the whole of its oil load, pressure on the advancing head 19 would progressively increase until it reached, at the well base, a value between 30 and 40 relative atmospheres. It is evident that such a cable 10 would get irremediably damaged long before it reaches said well base and would be damaged as soon as the loads involved, and therefore stresses on its structure, would exceed limits provided for by cable construction.

In accordance with the present invention, the resulting oil pressure due to the weight thereof is reduced below a damaging value by subjecting the oil, at least downstream of the curvature section F and along the whole length of the cable 10 into the vertical well 12, to a torricellian vacuum, while maintaining on the advancing head 19 an insulating oil or impregnating oil column, corresponding to a pre-established positive pressure consistent with the limits provided for in the cable construction. Downstream of the curvature section F, the oil filled cable 10 is relieved from any stress, and it does not undergo other concomitant stresses. Therefore, there is no risk of cable breakage which may permit air — and with it electrically undesirable moisture — to filter into the cable 10.

The critical point is the head 19. It is known to those skilled in the art that joints and terminals always represent the weakest electrical zones of a cable, but the head 19 is under a positive pressure, and any micro-defect would be filled by insulating oil which would percolate and which, in turn, would oppose the ingress of air.

A preferred embodiment of the system, according to the present invention, comprises acting on the trailing head 16 of the cable 10 by means of the tank 18 and reducing the insulating oil pressure to such a value that the oil level along said catenary takes a height $h_1$ lower than or equal to height $h$, but higher than the height $h_o$ of an impregnating oil column corresponding to zero relative pressure, preferably, with respect to the lowest turn of the skein 13. Such pressure reduction is carried out when, by reason of the cable transit along the vertical well 12 as the head 19 advances, a pre-established positive pressure arises, consistent with the limits provided by the cable construction.

Suppose, for example, this pre-established pressure occurs when the forward head 19 is in the position shown in FIG. 1 and for an insulating oil column of a height $h_2$ corresponding, as hereinbefore-mentioned, to a pre-established pressure consistent with the limits imposed by cable construction. The windings of the skein 13 and internal head 16 remain under an insulating oil positive pressure, and therefore, they are immune to air infiltration. When pressure is reduced and the pressure, as read on the gauge 17, starts to decrease with respect to pressure at the height $h$, a liquid vein within the curvature section F breaks up and a free surface $\sigma1$ of insulating oil within the portion between the skein 13 and the pulley 15 reaches the height $h_1$ which may be equal to $h$ but, preferably, lower, as it shown in FIGS. 1 and 2. Between the free surface $\sigma1$ (FIG. 1) within said last-mentioned portion and the surface $\sigma2$ of the insulating oil column pressing on the head 19 there is, therefore, a torricellian vacuum.

As the cable 10 further descends along the vertical, the free surface $\sigma2$ descends into the well 12 following the head 19 in its descent, whereas the free surface $\sigma1$ remains in a constant or fixed position. This means that the cable 10 descends into the well 12 under torricellian vacuum condition.

In case the height $h_1$ of $\sigma1$ coincides with the height $h$, then, torricellian vacuum would be obtained at least rearwardly of the curvature section F with respect to the advancing direction of the cable 10, i.e., within the vertical portion of the latter.

It may happen that during descent of the cable 10 into the vertical well 12 and when the cable 10 has already been introduced into the gallery 11 in which it advances in the direction of the arrow P, oil draining from papers has a tendency to cause a pressure increase on the head 19. The operator in charge can read this fact from the vacuum gauge 20 and he then opens the overpressure valve 22 and re-establishes the wanted equilibrium. If, on the other hand, due to micro-defects, the head pressure $h_2$ decreases down to values which tend to be too low, i.e., inconsistent with the purpose of avoiding air infiltration, the tank 18 is operated in order to give rise to the condition that $h_1 > h$. Due to this condition, insulating oil overflows from the portion of the cable 10 upstream with respect to the curvature section F to downstream of the cable 10 and it is permitted to overflow as much as necessary for re-establishing and maintaining on the head 19 the pre-established pressure, or a pre-established column $h_2$ of insulating oil consistent, as already stated, with limits imposed by cable construction.

When the cable 10, after descending along the whole length of the well 12, enters the gallery 11, the insulating oil tends to take a horizontal position, and the insulating oil column acting on the head 19, tends to decrease, until, after a certain amount of the cable 10 is in the gallery 11, a condition arises for which such an insulating oil column would become equal to $\phi$, where $\phi$ is the internal diameter of the cable 10. From this moment on, the situation becomes critical. If the cable 10 continues to advance, a negative relative pressure, readable on the vacuum gauge 20 would arise at the head 19. As this must be prevented, the initial desired oil column pressure is re-established, for example, in the column $h_2$ at the free surface $\sigma2$, by way of again operating the tank 18 so that said level $h_2$ is reached letting, as hereinbefore stated, insulating oil overflow beyond the curvature section F, for a condition $h_1 > h$.

Advancing of the cable 10 along the gallery 11 in the direction of the arrow P is preferably obtained by way of a system known by those skilled in the art as "lateral bonding". The cable 10 is laterally fixed on a steel rope provided with especially made straps for cable fixing (not shown), which rope is pulled by an appropriate means, e.g., a small electric train, also not shown.

After it is laid, the cable 10 may be, as shown in FIG. 3, a continuous element along the whole length of the gallery 11 (some tens of kilometers) and may be joined by means of stop joints at both heads 19 and 16, to cables 24 and 25, which cables 24 and 25, in turn, are respectively connected with feeding and utilization equipment, and constructed for resistance to high pressures.

As will be observed, these cables 24 and 25 proportionally more expensive, per linear meter, than the cable 10, are each of only a few hundred meters in length, and therefore, they are of a negligible length with respect to the length of some tens of kilometers of the cable 10. Accordingly, the installation will nevertheless be very economical, due to the inexpensiveness of the cable 10 and the simple installations required for maintenance of such a cable.

Of course, should the gallery 11 length be excessive or technical reasons favor it, elements of the cable 10 may be interrupted by further stop joints, which also allow for oil feeding. For example, one of these joints might be provided at the intermediate section c of the gallery 11.

It will be apparent to those skilled in the art that means for carrying out the method of the invention and the facilities involved such as transportation devices, guides, cable suspension means, etc., may vary according to actual requirements.

Although preferred embodiments of the present invention have been illustrated and described, it will be apparent to those skilled in the art that various modifications may be made without departing from the principles of the invention.

What is claimed is:

1. A method for laying an oil filled cable which is subject to damage when the pressure of the oil therein exceeds a predetermined limit, from a first point to a second lower point which is below said fiirst point by a distance sufficient to cause the weight of said oil in a vertical length of said cable equal to said distance to exert a pressure on said cable which exceeds said limit, said method comprising:

feeding an end of said cable with said oil under normal pressure therein from said first point to a third point at a level above said first point by a further distance which is sufficient to produce a relative oil pressure of zero within the cable and at a fourth point therein intermediate said first and third points but which is insufficient to cause the oil pressure in said cable to exceed said limit;

feeding said end of said cable from said third point downwardly toward said second point;

as said cable is fed from said third point to said second point and prior to the time that the pressure at said end thereof exceeds said limit, reducing the pressure of the oil in said cable at said first point thereby to cause oil to flow away from said third point whereby a vacuum is produced in said cable adjacent said third point and the pressure of the oil at said end of said cable is reduced; and continuing the feeding of said cable end downwardly to said second point while maintaining the pressure of the oil at said end at less than said limit by adjusting the pressure of the oil in said cable at said first point.

2. A method as set forth in claim 1, wherein said pressure of the oil in said cable is reduced at said first point until a pair of vacuum-oil interfaces are produced, a first interface between said third point and said first point and a second interface between said third point and said end of said cable, with said first interface above said fourth point.

3. A method as set forth in claim 2 further comprising adjusting the distance of said second interface from said cable end, and hence, the vacuum to which the portion of the cable between said third point and said cable end is subjected, by increasing the pressure on the oil at said first point and thereby causing oil to flow from intermediate said third and said first points into said portion of said cable.

4. A method as set forth in claim 1 further comprising feeding said cable end from said second point to a fifth point disposed horizontally with respect to said second point while maintaining the pressure of oil at said end at less than said limit.

5. A method as set forth in claim 4, wherein an increase in pressure at said head after it has passed said second point is reduced by removing oil from said cable at said end.

* * * * *